United States Patent [19]

Aoyama

[11] Patent Number: 5,067,763
[45] Date of Patent: Nov. 26, 1991

[54] PARTS SUPPLYING APPARATUS

[76] Inventor: Yoshitaka Aoyama, 20-11, Makitsukadai 2-chome, Sakai, Osaka 590-01, Japan

[21] Appl. No.: 481,027

[22] Filed: Feb. 16, 1990

Related U.S. Application Data

[62] Division of Ser. No. 210,490, Jun. 23, 1988, Pat. No. 4,943,098.

[30] Foreign Application Priority Data

| Jun. 26, 1987 | [JP] | Japan | 62-160477 |
| Sep. 5, 1987 | [JP] | Japan | 62-222839 |
| Oct. 9, 1987 | [JP] | Japan | 62-255567 |
| Oct. 16, 1987 | [JP] | Japan | 62-262488 |

[51] Int. Cl.⁵ .................................. H02N 15/00
[52] U.S. Cl. ........................ 294/65.5; 198/468.5; 901/40; 221/212; 414/737
[58] Field of Search ............. 198/468.5; 221/212; 294/65.5; 901/40; 414/737, 744.8, 751; 209/904, 907

[56] References Cited

U.S. PATENT DOCUMENTS

| 2,683,618 | 7/1954 | Long | 294/65.5 |
| 2,873,017 | 2/1959 | Allen et al. | 221/212 X |
| 2,976,075 | 3/1961 | Budreck | 294/65.5 |
| 3,200,931 | 8/1965 | Voorhies | 221/212 X |
| 3,311,259 | 3/1967 | Brown | 221/212 X |
| 3,789,336 | 1/1974 | Gordin | 294/65.5 X |
| 4,372,538 | 2/1983 | Balfanz | 198/468.5 X |

FOREIGN PATENT DOCUMENTS

| 1119582 | 6/1956 | France | 294/65.5 |
| 5614943 | 4/1981 | Japan | 198/468.5 |
| 0093251 | 5/1984 | Japan | 221/212 |
| 0127941 | 7/1985 | Japan | 198/468.5 |
| 0860997 | 9/1981 | U.S.S.R. | 221/212 |
| 0956235 | 9/1982 | U.S.S.R. | 221/212 |
| 1364591 | 1/1988 | U.S.S.R. | 294/65.5 |
| 0738193 | 10/1985 | United Kingdom | 294/65.5 |

Primary Examiner—Robert P. Olszewski
Assistant Examiner—James R. Bidwell
Attorney, Agent, or Firm—Armstrong, Nikaido, Marmelstein, Kubovcik & Murray

[57] ABSTRACT

A parts supplying apparatus for carrying and supplying a part such as a projection nut to a predetermined point in space comprises a telescopic supply rod including an outer and inner shaft, and a magnet being fixed to a proximal end of one of the two shafts. The supply rod first extends in its entirety towards the predetermined point, or destination, with the part attracted and held at the proximal end by way of the magnet. When the part reaches slightly short of its destination, relative displacement in longitudinal direction of the outer and inner shafts takes place so that the magnet is moved away from the part until its magnetic force on the part is no more influential, whereupon the part is allowed to fall under gravity down to the destination accurately.

7 Claims, 7 Drawing Sheets

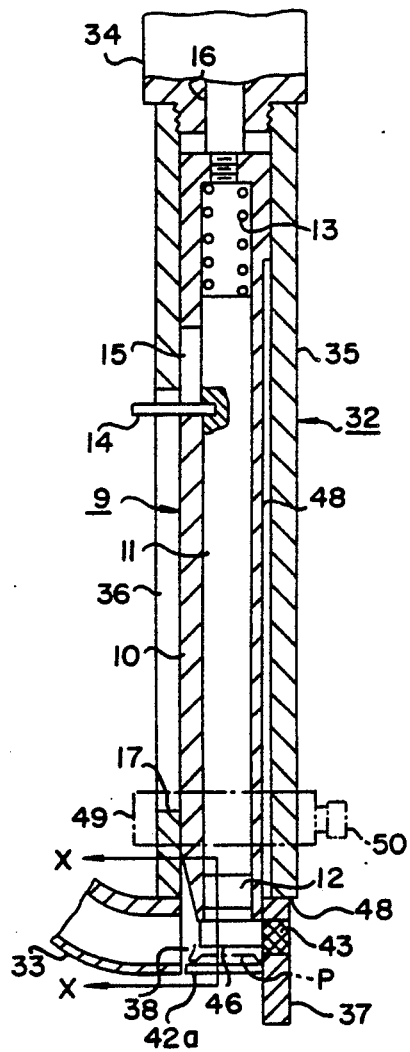
FIG. 8
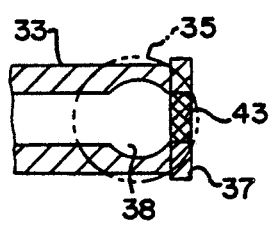
FIG. 9
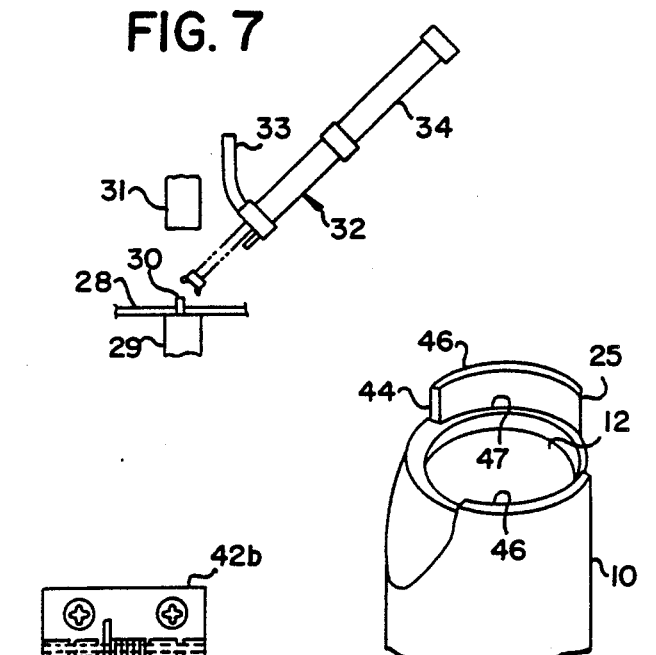
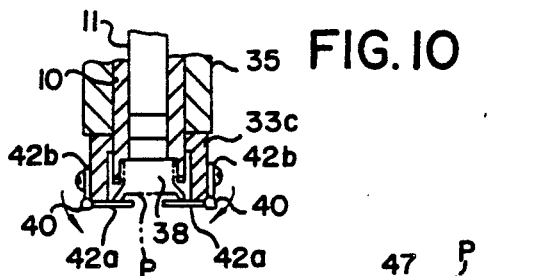
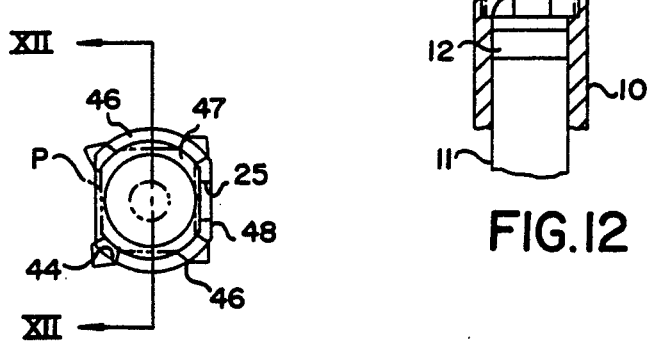

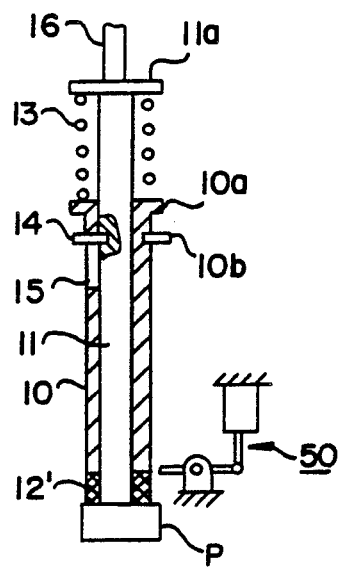
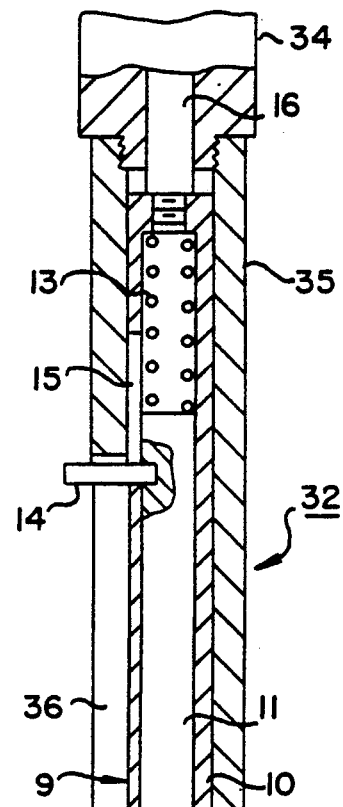
FIG.15
FIG.16

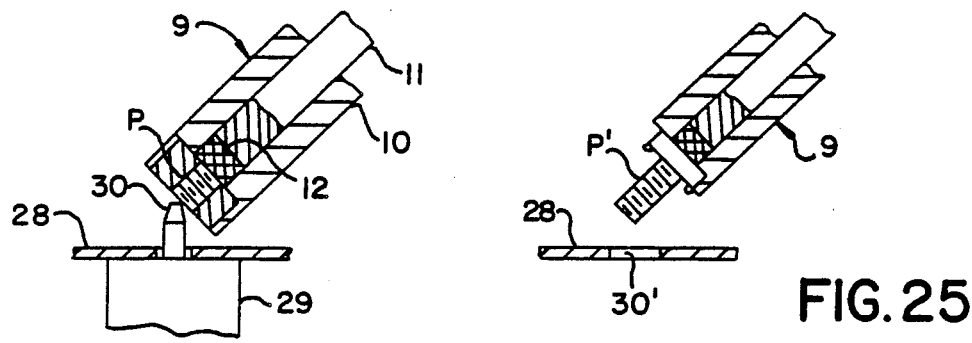
FIG. 24  FIG. 25
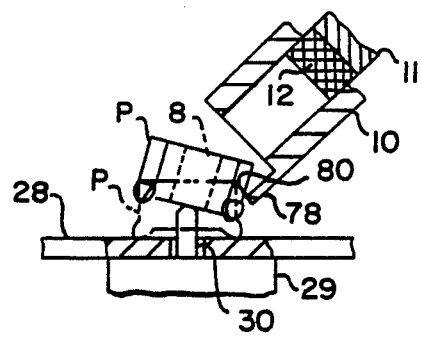
FIG. 27
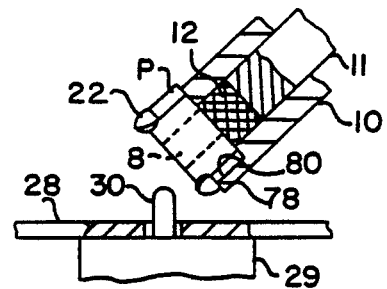
FIG. 26
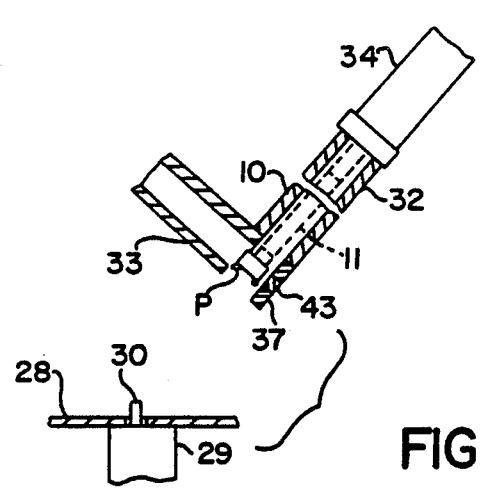
FIG. 28
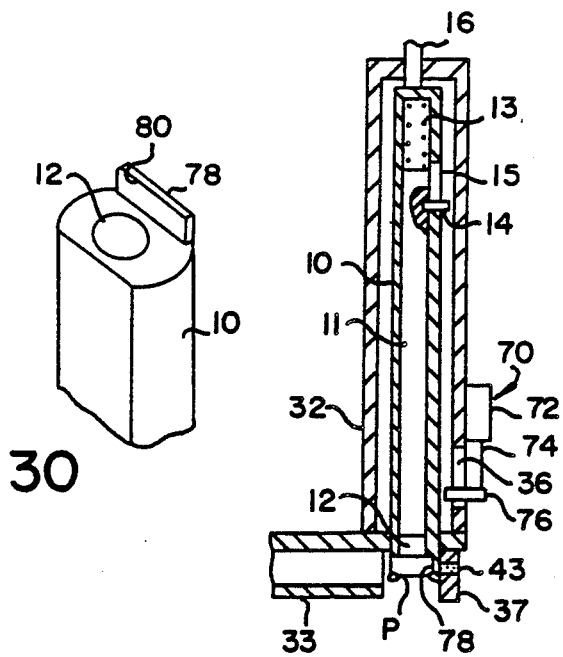
FIG. 30
FIG. 29

PARTS SUPPLYING APPARATUS

This is a division of application Ser. No. 210,490 filed June 23, 1988, U.S. Pat. No. 4,943,098.

BACKGROUND OF THE INVENTION

1. Field of the Invention

The present invention relates to a method and apparatus for supplying parts, whose prime object is to supply projection nuts, projection bolts and the like having welding projections reliably to the destination.

2. Prior Art

In such existing apparatus having a telescopic supply rod provided with a guide pin projected at the end, a nut is supplied with the pin extending into a screw hole of the projection nut which is to be supplied, but the nut being supplied is attracted and held by an electromagnet fixed to a stationary member. However, as the supply rod proceeds downwardly the nut becomes more distant from the electromagnet and the electromagnetic force is deteriorated, so that when external forces such as some vibrations are exerted the nut tends to drop imprudently before reaching the destination. Such uncertainty necessitates the pin to be inserted always into the screw hole, and therefore the apparatus is not applicable to a cap nut or lid nut without a through hole. Moreover, though the nut attracting force must be eliminated surely and promptly at a predetermined point of time, when a residual magnetism is present in the supply rod, a reliable operation is not possible as the nut may not come off from the supply rod.

Also an apparatus in which an oil seal is carried to the shaft end so as to be engaged thereto is known, in this case a hollow outer shaft and inner shaft are combined slidably, and the oil seal mounted to the inner shaft end is forcibly transferred to the shaft by the outer shaft which descends alone relatively further after the inner shaft being positioned coaxially with respect to the shaft. However, it is difficult to hold the oil seal accurately at the end of the inner shaft, because inner diameters of the oil seals are slightly different from each other so that the engagement to the inner shaft varies diversely upon each oil seal, slipping out freely in the worst case.

As it will be understood from the foregoing description, objects are to prevent uncertainty of the electromagnet for holding the parts, to ensure the applicability to the parts without through hole and to solve the uncertainty of holding the parts in the supply rod of double construction.

SUMMARY OF THE INVENTION

In order to solve aforesaid problems, the present invention comprises an inner shaft inserted into a hollow outer shaft slidably to form a supply rod, a magnet is disposed at the end of one of the inner and outer shafts to attract and hold a part, at the end of the other shaft a projection for receiving and supporting the part is formed, and the two shafts are relatively displaced near the destination of parts to forcibly push out the part, whereby the part which is so far held at the end of the supply rod is separated therefrom as overcoming the retaining force of the magnet by the relative axial movement of the inner and outer shafts and supplied to a prescribed position.

In another useful mode of the present invention, in order to overcome the uncertainty of holding the part by the magnet, a magnetic force is reduced or eliminated to the acceptable level after the part is brought surely to the destination so that it will not slip out on the return motion of the supply rod. That is, in the supply rod constituted by the hollow outer shaft and inner shaft inserted slidably thereinto, the magnet for holding the part is disposed at the end of one of the two shafts, a mechanism is provided to retract the shaft onto which the magnet is disposed after the part held by the magnet has arrived at the destination and a whole supply rod is retracted after said one shaft has retreated, whereby the part held at the end of the supply rod is, under the constant retaining force, brought to the destination where the magnetic force is reduced remarkably or eliminated to leave the part at the prescribed location without being slipped out from the supply rod on its return motion.

In still another useful mode of the present invention, in the supply rod comprising the hollow outer shaft and inner shaft inserted slidably thereinto, the magnet for holding the part is disposed at the end of the inner shaft, a projection for receiving the part is formed at the end of the outer shaft and a drive means is provided to forcibly retract the inner shaft after two shafts have advanced in a body to the prescribed position and stopped, whereby the part is retained by the projection of the outer shaft and released surely when the inner shaft is retracted alone after the two shafts have stopped.

In a method of supplying parts according to the present invention, the supply rod provided with a projection for supporting the parts from below at its end is advanced obliquely downward or substantially horizontally with a part attracted thereat magnetically and stopped immediately before the destination, approximately at the same time the magnetic force exerted on the part is eliminated to allow it to pivot on an end corner of the projection and land accurately on the suitable location of the objective waiting thereunder to accomplish the supply of parts reliably.

These and other features of the present invention will become more apparent from the following description with reference to the accompanying drawings.

BRIEF DESCRIPTION OF THE DRAWINGS

In the accompanying drawings, like reference characters denote like parts or members throughout all views, in which

FIG. 7 is a side view of the present apparatus applied in supplying the projection nut in a spot welder;

FIG. 8 is a longitudinal sectional view of a supply unit embodying the present invention;

FIG. 9 is a transverse sectional view showing the end of a parts feed tube;

FIG. 10 is a sectional view taken along the line X—X of FIG. 8;

FIG. 10A shows an open-and-close plate;

FIG. 11 is an end view of an outer shaft;

FIG. 12 is a sectional view taken along the line XII—XII of FIG. 11;

FIG. 13 is a perspective view of the bottom end of an outer shaft;

FIGS. 14A to 14D and FIG. 15 are longitudinal sectional views showing the principle construction of another embodiment;

FIG. 16 is a longitudinal sectional view of a supply unit;

FIGS. 24 and 25 are partially sectional views showing a transient period of parts supply;

FIGS. 26 and 27 are locally longitudinal sectional views for explaining a method of parts supply according to the present invention;

FIG. 28 is a longitudinal sectional view showing a whole apparatus;

FIG. 29 is a partially longitudinal sectional view of an apparatus; and

FIG. 30 is a perspective view similar to FIG. 17 showing the end of a supply rod.

DESCRIPTION OF THE PREFERRED EMBODIMENTS

Figure 1A:
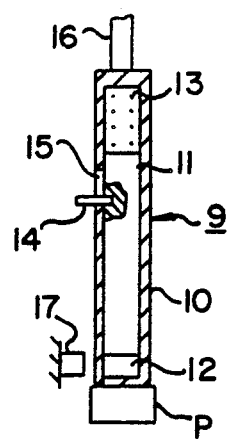
FIG. 1A to FIG. 1C are longitudinal sectional views showing the principle construction of an apparatus according to one embodiment of the present invention sequentially.
Figure 1B:
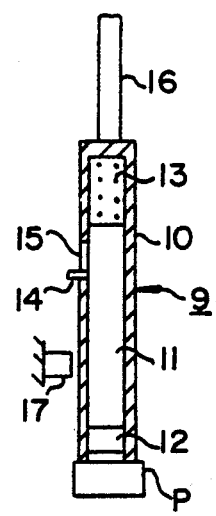
Figure 1C:
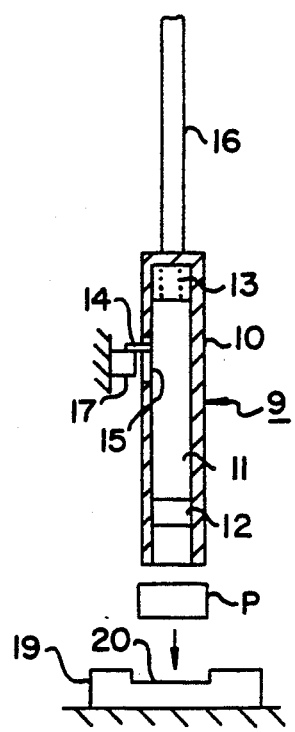

Explaining the embodiment of the present invention with reference to FIG. 1A to FIG. 1C showing a basic principle, a supply rod 9 comprises a hollow outer shaft 10 and an inner shaft 11 inserted slidably thereinto, at the end of which there is fixed a magnet 12. The inner shaft 11 is resilient in the forcing direction by a coil spring 13, and its lower limit is set by a regulating pin 14 fixed to the inner shaft 11 and abutting the lower end of a slot 15 in the outer shaft 10. The outer shaft is made of a non-magnetic material such as stainless steel.

In order to move the supply rod 9 downward, there is connected an actuating rod 16 which is moved up and down by an output of a hydraulic cylinder (not shown). A stopper member 17 is secured to a stationary member to catch the regulating pin 14, and at the end of the supply rod 9 a magnetic material part P is attracted and held by the magnet 12.

In FIG. 1B, the supply rod 9 is shown in its advancing state, in which the regulating pin 14 is approaching the stopper member 17. When the supply rod 9 is advanced sufficiently, though the inner shaft 11 stopped as the regulating pin 14 hits the stopper member 17, the outer shaft 10 continues to advance compressing the coil spring 13, consequently the part P is forcibly kept away from the magnet 12, thereby its attracting force is weakened and finally, as shown in FIG. 1C, the part P is separated from the end of the outer shaft 10 and supplied into a cavity 20 of an objective parts 19.

Figure 2A:
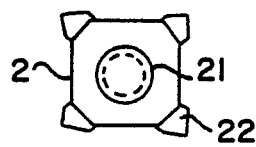
FIGS. 2A and 2B are respectively a broken side view and plan view of a projection nut.
Figure 2B:
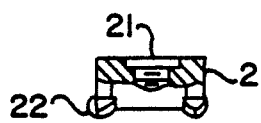
Figure 3:
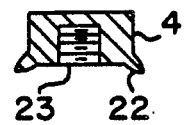
FIG. 3 is a longitudinal sectional view of a cap nut.
Figure 4:
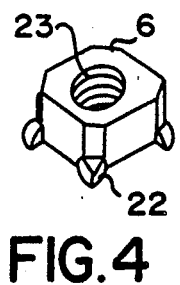
FIG. 4 is a perspective view of a projection nut.

Though the projection nut 2 with a lid 21 shown in FIGS. 2A and 2B and the cap nut shown in FIG. 3 without through holes are typical parts to be supplied indicated at P, it will be appreciated that, in the present invention, as readily understood from the construction and operation to be described later, those with a through hole (FIG. 4) are also applicable with the same effect. In general, as it will be clearly understood from FIG. 4, the projection nut has a square shape with projections 22 for welding disposed in the four corners.

Figure 5:
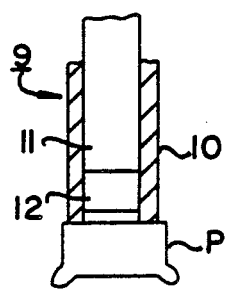
FIGS. 5 and 6 are longitudinal sectional views showing the end of a supply rod.
Figure 6:
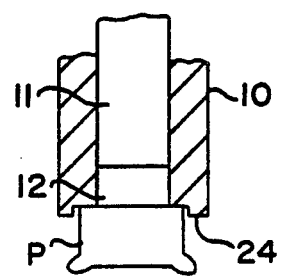
Figure 14D:
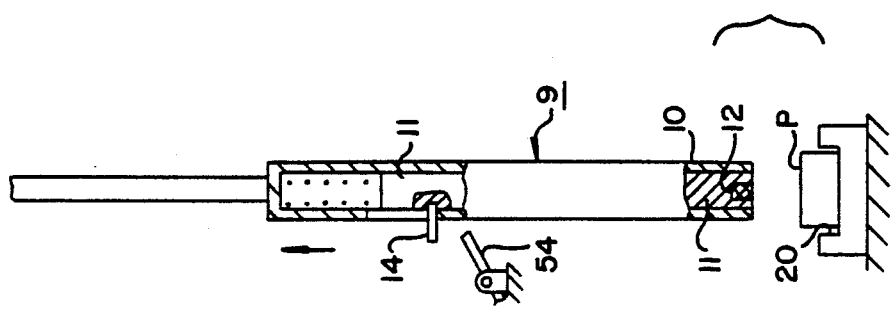
Figure 14C:
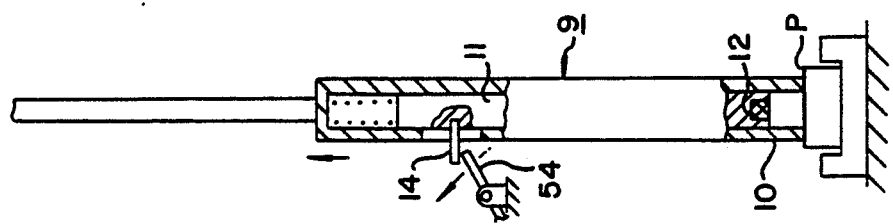
Figure 14B:
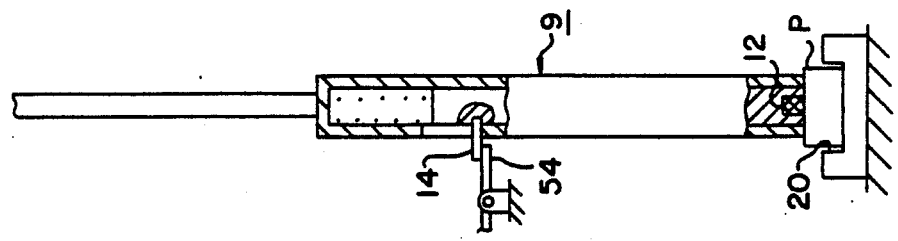
Figure 14A:
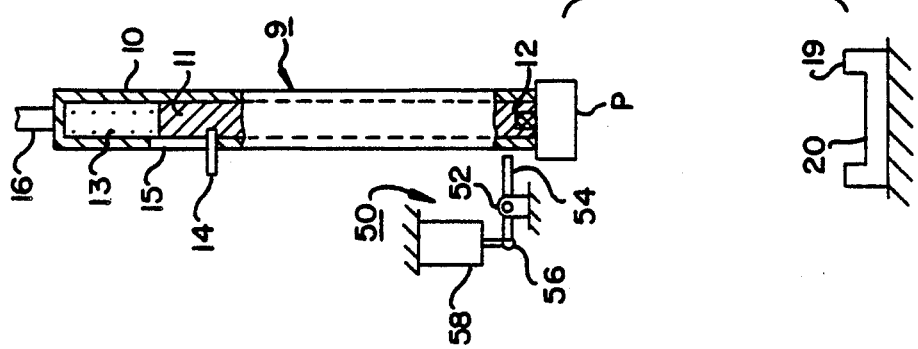

FIG. 5 shows the enlarged end portion of the supply rod 9 in FIG. 1B, and FIG. 6 shows a modified example in which an annular projection 24 is provided on the end surface of the outer shaft 10 for preventing shifting of the part P being attracted and held.

Next, the embodiment of FIG. 7 through FIG. 13 applied in supplying projection nuts in the spot welder will be explained. As shown in FIG. 7, an objective steel plate parts 28 to which the nut is fixed is placed on a stationary electrode 29, whose guide pin 30 is projected from the steel plate parts 28. The numeral 31 denotes a movable electrode disposed coaxially with the stationary electrode 29.

To a supply unit 32 a chuter or feed tube 33 of the parts as well as an actuating cylinder 34 are connected. Details of the supply unit 32 are shown in FIG. 8, in which the outer shaft 10 is coupled to the actuating rod 16 of the air cylinder 34, the inner cylinder 11 is disposed within the outer cylinder 10 and the regulating pin 14 is projected outward through the slot 15. When the actuating rod 16 is advanced, the two shafts 10, 11 move downward together without relative displacement in the beginning, at this time the regulating pin 14 is moved along the slot 36 in an outer cylinder 35 till it strikes the lower end of the slot 36 (corresponding to the stopper 17), then the inner shaft 11 is stopped and only the outer shaft 10 is advanced to achieve the operation described above. The outer cylinder 35 is coupled to the air cylinder 34 rigidly.

The end portion of the feed tube 33 is bifurcated as seen in FIG. 9 and a guide plate 37 is fixed to its end surface. The outer cylinder 35 is welded above the end of the feed tube 33, thereby a temporary hold chamber 38 for the nut P is formed at the aforesaid forked portion which is opened downward. As it is apparent from FIG. 10, open-and-close plates 42a having pivot axes 40 are provided at both sides resiliently in the closing direction indicated by an arrow in FIG. 10 by helical springs mounted to the pivot axes 40.

That is, the open-and-close plates 42a are provided to hold the nut P temporarily securely and pivotally connected to the pivot axes 40 fixed to the forked portions 33c of the chuter. In effect, one wing piece of a hinge is in the form of open-and-close plate 42a and the other wing piece is as a fixed plate 42b, fixed to the forked portion 33c by means of bolts. The helical springs 41 mounted to the pivot axes 40 render resiliency to the open-and-close plates 42a in the closing direction to keep them in the state shown in FIG. 10. Double-dot chain lines in FIG. 10A show the open-and-close plates 42a in the open state.

A magnet 43 is embedded in the guide plate 37 to accelerate the nut P entering into the temporary hold chamber 38 from the feed tube 33 and to attract it and hold temporarily. Referring to FIG. 11 through FIG. 13 showing the bottom end of the supply rod 9, at the end of the outer shaft 10 a notch 44 is formed as an inlet through which the nut P fed from the feed tube 33 passes, and on the opposite side thereof also a notch 25 is opened to form a pair of circular arc projections 46. It will be appreciated that a horseshoe-shaped projection can be formed instead of providing the notch 25. Also, a hold step 47 is formed by cutting the projections 46 thinner, and for bringing the guide plate 37 near to the center side of the nut P, one side of the outer shaft 10 is cut off flatly which is, in particular, indicated at 48 as apparent from FIG. 8. In order to change the lower end position 17 of the slot according to the condition, as shown by the imaginative line in FIG. 8, a slide ring 49 may be provided on the outer cylinder 35. The slide ring 49 is secured by a bolt 50 after positioned with respect to the lengthwise direction of the outer cylinder 35.

When the supply rod 9 is retracted to the outermost position, its projections 46 are projected into the temporary hold chamber 38, and the nut P fed through the feed tube 33 passes through the notch 44 as being attracted by the magnet 43 and rests between the projections 46. In this case, as the nut P is also attracted upward by the magnet 12 on the inner shaft side, the upper surface of the nut P is contacted to the hold step 47 and its corner is also contacted to the inner surface of the projections 46 by the force of the magnet 43 so as to be positioned within the temporary hold chamber 38.

When entering since it is necessary for the nut P to pass the notch 44 smoothly, the magnet 43 is given a greater magnitude of attracting force than the magnet 12. Thereby, the attracting force toward the guide plate 37 is dominant allowing the nut to enter the temporary hold chamber 38 or between the two projections 46 at a strong force, and positioned vertically by the attracting force of another magnet 12 so as to be held temporarily in position.

The basic principle shown in FIGS. 1A to 1C thus embodied in the practical construction is the embodiment of FIGS. 7 to 13, whose operation is similar to that described in FIGS. 1A to 1C, so its explanation will be omitted.

According to the aforesaid embodiment of the present invention, since the part is attracted by the magnet fixed to the inner shaft of the supply rod and held externally by the projections at the outer shaft end, regardless of the presence of the through hole, it can be supplied certainly to the destination without slipping out unnecessarily. By rendering relative sliding displacement to the inner and outer shafts combined slidably, the part is forcibly separated from the magnet and released surely just before the destination, thus the reliable parts supply can be realized and the problems in the conventional apparatus described heretofore are solved surely.

FIGS. 14A to 14D show the basic principle of another embodiment of the present invention, in which the construction of the supply rod indicated generally at numeral 9 is similar to that described with reference to FIG. 1A through FIG. 13.

Referring to a mechanism 50 for retracting the inner shaft 11 which is peculiar to the embodiment, an actuating lever 54 which is fixed to a pivot axis 52 of the stationary member is provided with its one end being coupled to an actuator 58 through a pin 56 and the other end projecting to the position where it is engageable with the regulating pin 14. As the actuator 58, a hydraulic cylinder, electromagnetic solenoid and the like may be utilized. A vertical position of the actuating lever 54 and size of the slot 15 are set in such a manner that the part P fits into the cavity 20 at the stroke position where the actuating lever 54 touches the regulating pin 14 exactly or with a small gap therebetween. As a method for feeding the parts P to the end of the supply rod 9, various methods such as the aforesaid chuter 33 may be adopted.

FIG. 14 A shows the part P attracted to the end of the supply rod 9 and waiting for the actuating rod 16 to be advanced. FIG. 14B shows the part P which has, by the advance of actuating rod 16, just arrived at the cavity 20 but still held by the magnet 12. At this time, the actuating lever 54 is in contact with the regulating pin 14 as described above. In FIG. 14C, the outer shaft 10 remains just as it is and the inner shaft 11 is retracted, which is effected by compressing the coil spring 13 by the actuating lever 54 pivoted by the actuator 58 as indicated by an arrow. As the result, the magnet 12 is spaced apart from the part P, thereby the attracting force to the part P is eliminated or reduced to the level where the part P is not influenced at all. In FIG. 14D, the whole supply rod 9 is retreating after the inner shaft 11 has retreated. In this retreating transient period, since the magnet 12 is kept away from the part P by the actuating lever 54, the part P can be remained surely in the cavity 20.

FIG. 15 shows a modified example, in which magnet 12' is disposed on the outer shaft 10 and between flanges 10a, 11a provided on the two shafts 10, 11, the coil spring 13 is disposed, whose tension is received by the regulating pin 14 contacting the upper end of the slot 15. The mechanism 50 for retreating the outer shaft 10 is similar to that already described, and a pin 10b corresponding to its actuating lever 54 is fixed to the outer shaft 10. Operations of the modified example will be readily understood from the description with reference to FIGS. 14A to 14D, so that its explanation will be omitted.

Next, the embodiment of FIGS. 16 and 17 applied in supplying the projection nut in the spot welder shown in FIG. 7 will be explained. As it will be apparent from the drawings, its construction is very close to that of the embodiment of FIG. 8, so that only the portions different from FIG. 8 will be explained here and like parts or members are shown by like reference characters and their explanation will be omitted.

At the lower portion of the outer cylinder 35, the mechanism 50 for retracting the inner shaft 11 is disposed. The mechanism 50 employs an electromagnetic actuator 60 whose actuating rod 62 is bent to position on a locus of movement of the regulating pin 14.

Figure 17:
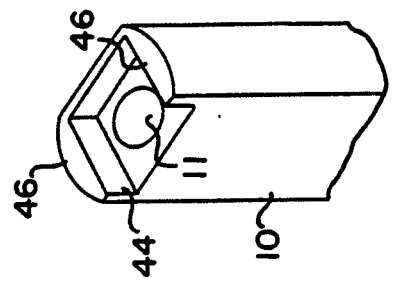
FIG. 17 is a perspective view showing the end of the supply rod.

As it will be understood from FIG. 17, the section of the outer shaft 10 includes opposing planes and the projection 46 is projected from the end, one side of which is open to form an inlet by a notch 44 through which the nut P is allowed to enter.

When the supply rod 9 is retracted to the outermost position, the projection 46 is projected into the temporary hold chamber 38 and the nut P fed through the feed pipe 33 passes the notch 44 as being attracted by the magnet 43 and rests inside the projection 46. In this case, since the nut P is also attracted upward by the magnet 12 on the inner shaft side, the upper surface of the nut P comes in a close contact with the lower surface of the supply rod 9 as shown by the double-dot chain line in FIG. 16.

The basic principle shown in FIGS. 14A to 14D thus embodied in the practical construction is the embodiment of FIGS. 16 and 17, whose operation is similar to that described in the basic principle, so its explanation will be omitted.

The case where the magnet is disposed on the outer shaft shown in FIG. 15 can also be embodied in the same manner as described with reference to FIGS. 16 and 17, so the detailed description will be omitted.

Figure 18:
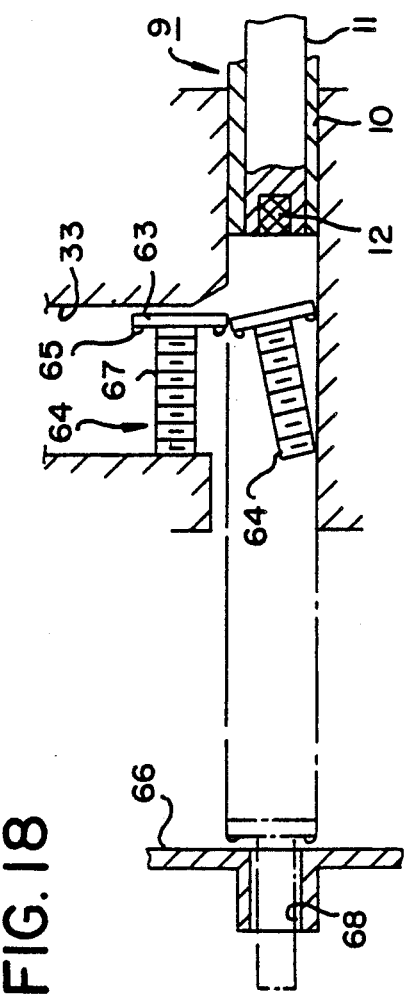
FIG. 18 is a longitudinal sectional view showing another embodiment.

FIG. 18 is a schematic view showing the embodiment in which a bolt 64 comprising a base plate 63, welding projections 65 and thread 67 is moved laterally so as to be inserted into a hole 68 of an objective part 66. A supply rod, magnet, etc. are constructed the same as those already described, thus indicated at like reference numerals. Retreating operation of the inner shaft 11 or the like is as same as those already described, while the supply rod 9 is advanced toward the bolt 64 waiting obliquely at the outlet of the feed tube 33 and pushing out the bolt 64 with its base plate 65 attracted to the end face of the supply rod by the magnet 12.

Figure 19:
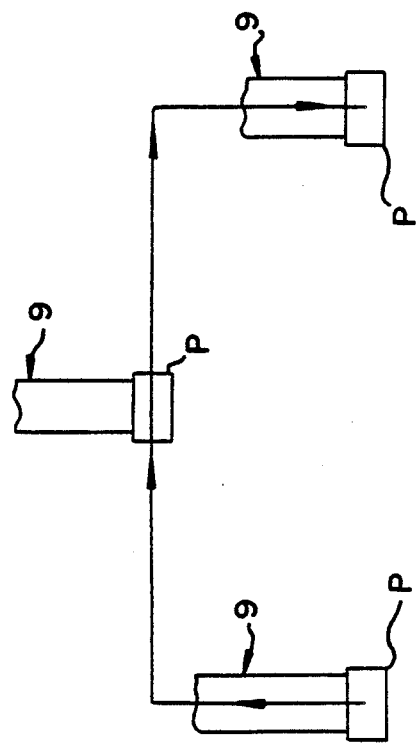
FIG. 19 is a schematic view showing still another embodiment.

In the case of FIG. 19, the part 9 is conveyed along the locus of upward, horizontal and downward movements as shown by the arrow lines which are effected by suitable known mechanisms as in the figure.

According to the aforesaid embodiment of the present invention, since the part is conveyed attracted and held by the magnet fixed to either the inner shaft or the outer shaft of the supply rod and brought to the destination, the attracting and holding force on the part is constant regardless of the length of supplying stroke, thus the part will never slip off during the supplying stroke, besides as the same attracting and holding force is exerted even when the destination is reached, the part is not detached by the impact caused by its contact with the objective parts, thus it can be brought reliably to the destination.

When the part has arrived at the destination, only the shaft provided with the magnet is firstly retracted, so that the attracting and holding force on the part is eliminated or reduced to the level unaffected as its movement being restricted by the quiescent shaft. Accordingly, since the attracting and holding force is eliminated in the state where the part is placed at the destination, it is not influenced by the magnetic force at all when the whole supply rod retreats, ensuring the accurate placement at the destination.

Next, the embodiment shown in FIG. 20 through FIG. 25 will be explained.

Figure 22:
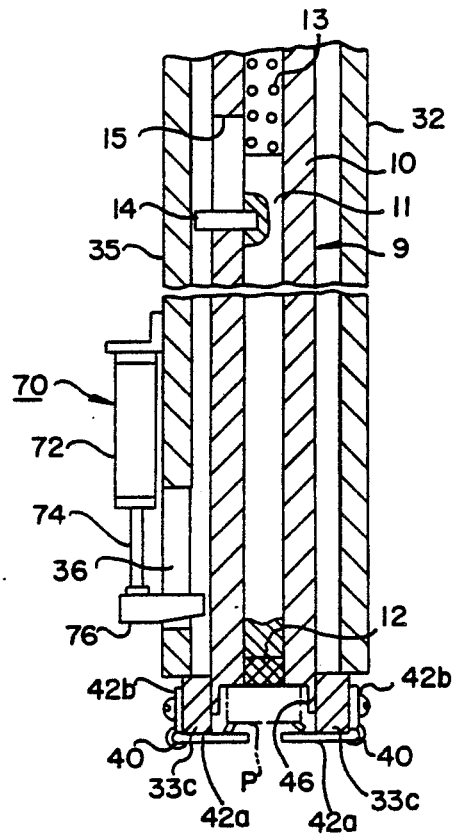
FIG. 22 is a longitudinal front view of the apparatus in FIG. 20
Figure 21:
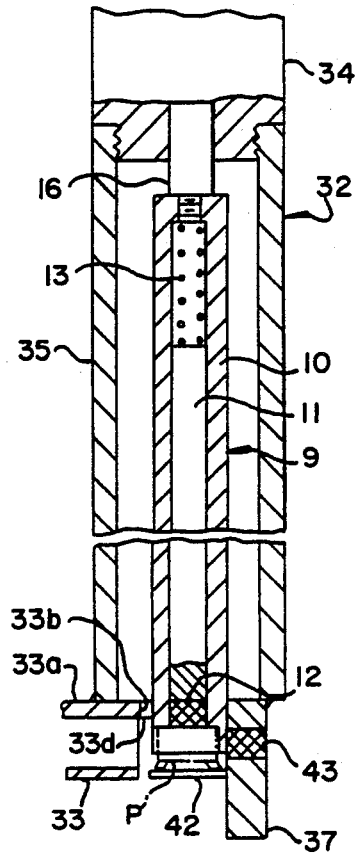
FIG. 21 is a longitudinal side view of the apparatus in FIG. 20.
Figure 20:
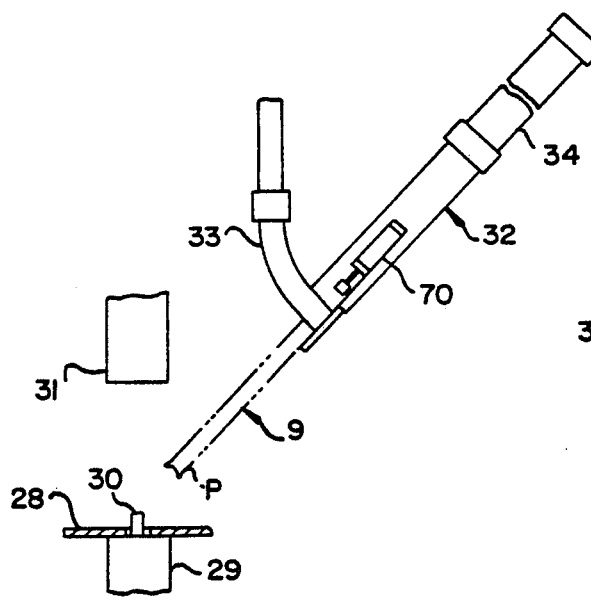
FIG. 20 is a slide view of an apparatus showing a further embodiment.

A plate part 28 is placed on a stationary electrode 29, whose guide pin 30 extends through the plate part 28. The numeral 31 denotes a movable electrode. A parts supplying apparatus comprises a supply unit 32 and air cylinder 34. Referring to the supply unit 32, a supply rod 9 is constituted by combining a hollow outer shaft 10 and an inner shaft 11 slidably on the outer shaft 10, as it is apparent from FIG. 23, opposing planes are provided to serve as a whirl-stop to be described later. A magnet 12 (permanent magnet) is coupled, e.g. with an adhesive, to the end of the inner shaft 11, and end surfaces of the outer shaft 10 and the magnet 12 are, as shown in FIGS. 21 and 22, flush with each other to form a plane, to which a projection nut P is attracted and held, till the prescribed position is reached.

A regulating pin 14 fixed to the inner shaft 11 extends through a slot 15 open in the outer shaft 10 in the direction of stroke and projects further from the outer shaft 10. Between the inner and outer shafts 10, 11, a compression coil spring 13 is disposed in the outer shaft 10, a tension of which is received by the regulating pin 14 abutting the lower end of the slot 15. In this state, lower end surfaces of the magnet 12 and outer shaft 10 are flush with each other. The compression coil spring 13 disposed between the inner and outer shafts 10, 11 can be omitted when the position in FIGS. 21 and 22 is secured by gravity of the inner shaft 11.

Figure 23:
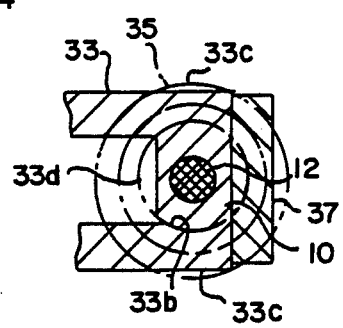
FIG. 23 is a sectional view through a magnet of the apparatus in FIG. 21.

A piston rod 16 of an air cylinder 34 is coupled to the supply rod 9. To an outer cylinder 35 containing the supply rod 9 the air cylinder 34 is secured at the top end, and a chuter 33 for leading a nut P is welded to its bottom end. A circular hole 33b in which the outer shaft 10 fits exactly is formed in an upper plate 33a of the chuter 33, whereby the end portion of the chuter 33 is forked as shown in FIG. 23 and a guide plate 37 is fixed to the end face of forked portions 33c, a plane of the outer shaft being in a close contact with the guide plate 37. A crescent gap formed between the circular hole 33b and a flat surface of the outer shaft may hinder the movement of the nut P, so that a padding piece 33d is welded for a nice contact. The reason why the guide plate 37 and padding piece 33d are in a close contact with the respective flat surfaces of the outer shaft is to prevent the outer shaft 10 or supply rod 9 as a whole from rotating, and for that purpose, therefore, both of the flat surfaces as shown in the figure or either of them should be in such a contact.

At the end of outer shaft 10, there is provided a projection for holding the parts. Though various shapes of the projection may be considered, for example, a U-shaped frame type projection 46 having an opening 44 on one side shown in FIG. 17 may be employed. As an alternative, though not shown, a forked projection can be utilized depending upon the shape of the parts.

Another magnet (permanent magnet) 43 is buried in the guide plate 37, thereby the nut P fed from the chuter 33 is attracted so that it enters smoothly into the frame of the projection 46.

As the one of the features of the present embodiment, the inner shaft is forcibly retracted after the inner and outer shafts have advanced in a body to a prescribed position and stopped. For this purpose, a drive means 70 is mounted on the side of the outer cylinder 35. As the drive means an electromagnetic solenoid may be used, but in this embodiment, an air cylinder 72 is used and to one end of its piston rod 74 an engaging piece 76 is fixed. The engaging piece 76 extends through a slot 36 in the outer cylinder 35 to the position on a locus of movement of the regulating pin 14 for engagement therewith.

In FIGS. 21 and 22, the nut P shown by the double-dot chain line which has entered the frame type projection 46 is attracted and held tightly by the magnet 12. Now, when the air cylinder 34 is actuated and the supply rod 9 is advanced, the nut P opens an open-and-close plate 42 and reaches the prescribed position, then the supply rod 9 is stopped. When the air cylinder 70 as the drive means is actuated thereafter, the inner shaft 11 is forcibly retracted through the engaging piece 76 and regulating pin 14, the magnet 12 is moved to the position where its attracting force on the nut P is eliminated, and the nut P is released and fit into an objective guide pin 30.

Referring to FIGS. 24 and 25 on the timing to retract the inner shaft 11 forcibly, in FIG. 24, the retraction is effected at the position where the guide pin 30 and the screw hole of the nut P is extremely close, so that most accurate timing can be obtained. FIG. 25 shows the case where a bolt P' is to be fit into a hole 30' in such a manner that the inner shaft is retracted after stopping the bolt P' little before the hole 30'.

According to the aforesaid embodiment of the present invention, since the part is attracted and held by the magnet and is supported by the projection formed at the end of the outer shaft, it can be held surely without slipping off unnecessarily during the advance of the supply rod.

The drive means for forcibly retracting the inner shaft after the inner and outer shafts have advanced in a body to the prescribed position and stopped is provided, so that when the prescribed position so referred to herein is set taking characteristics of the part and objective into account, for example, as in FIGS. 24 and 25, it is not necessary for the part to be moved in the air under unstable condition, thus problems of the prior art already described can be solved satisfactorily. Also, the retreat length of the inner shaft may be set suitably depending upon the magnetic force of the magnet, thus such a happening in which the part is pulled back as in the prior art will never occur.

Referring to FIGS. 26 through 30 on a method for supplying parts according to the present invention, a plate-shaped projection 78 for receiving underneath the nut P is disposed at the end of the supply rod 9 (FIG. 30). As already described with reference to FIG. 17, when a substantially U-shaped frame type wall 46 is used in lieu of the projection 78, retentivity of the nut P is improved. In order to hold the nut P at the end of the supply rod 10 by the magnetic force, a supply rod 10 is a hollow shaft as shown in the figure and an inner rod 11 is inserted thereinto slidably, the magnet 12 (permanent magnet) is fixed, e.g. with an adhesive, to the end of the inner rod 11, and bottom end faces of the magnet 12 and supply rod 10 are in alignment and flush with each other (FIG. 26). The supply rod 10 makes a stroke action obliquely downward or substantially horizontally. An objective steel plate part 28 is placed on a stationary electrode 29 whose guide pin 30 extends through a hole in the steel plate part 28. A movable electrode making a pair is not shown.

In FIG. 26, the supply rod 10 is stopped just before the guide pin 30, namely the destination, where the relative position of the screw hole 23 of the nut P and the guide pin 30 is set in advance such that they coincide when the nut turns as will be described later. When the inner rod 11 shown in FIG. 26 is retracted and the magnet 12 is separated from the nut P as shown in FIG. 27, the magnetic force on the nut P is eliminated, so that the nut P is pivoted counterclockwise about an end corner 80 of a projection tongue 78 whereupon the screw hole is fit to the guide pin 30 to complete the nut supply as shown by the double-dot line in FIG. 27.

FIG. 28 shows a whole apparatus for carrying out the aforesaid method, which is substantially the same as those shown in FIGS. 21 and 22, in which the supply rod 10 constructed as shown in FIGS. 26, 27 is contained movably in an outer cylinder 32, to the upper end of which an actuating cylinder (air cylinder) 34 is coupled and a chuter 33 for leading the nut P is welded to the bottom end thereof. At the end of the chuter 33, a guide plate 37 is fixed and the magnet (permanent magnet) 43 embedded therein serves to attract the nut P.

Referring to the mechanism as described in relation to FIG. 27 for retracting the inner rod 11 with the magnet 12 forcibly in conjunction with FIG. 29, the regulating pin 14 fixed to the inner rod 11 is projected outside the supply rod through the slot 15 extending in the longitudinal direction of the supply rod 10. An electromagnetic solenoid and the like may be used as a drive means 70, but here an air cylinder 72 is shown. An engaging piece 76 fixed to the end of its piston rod 74 extends to the outer cylinder through the slot 36 formed therein in the longitudinal direction and opposed to the regulating pin 14 for abutting engagement therewith. A compression coil spring 13 is disposed between the inner rod 11 and supply rod 10, whose tension is received by the regulating pin pressed to the lower end of the slot 15. A piston rod of the actuating cylinder 34 described is indicated at 16 and connected to the supply rod 10.

When the supply rod 10 shown in FIG. 29 is advanced by the piston rod 16 and stopped just before the destination, the regulating pin 14 is also stopped immediately before the engaging piece 76. Next, when the engaging piece 76 is pulled up by the air cylinder 72, the inner rod 11 is retracted forcibly through the regulating pin 14 as shown in FIG. 27.

The timing for eliminating the magnetic force on the nut P is substantially in synchronism with the standstill of the supply rod 10, and most preferably immediately thereafter.

In the above description, though the nut is attracted and held by the permanent magnet, as alternative ways and means, the end of the supply rod may be magnetized by an electromagnet which is to be demagnetized just before the destination.

According to the method for supplying parts of the present invention, since the supply rod is stopped just before the destination, the nut and guide pin are not required to contact, thus problems in the conventional method described heretofore can be prevented completely. Moreover, since the nut is held by the projection in a supporting fashion from below in addition to the magnetic attracting force, it will never slip out even during movement of the supply rod. Additionally, as the most essential point, since the nut comes down toward the guide pin as pivoting about the end corner of the projection, a locus of pivoting of the nut can be made constant at all times and the supplying accuracy relative to the guide pin can be improved remarkably.

The nut pivots on the end corner of the projection without contacting the guide pin, with no need for such a strict adjustment of contact position as in the prior art. That is, since the center of pivoting of the nut is fixed, tolerance of adjustment can be ensured with a large margin by the relationship between the bore of the nut and size of the guide pin or its length. The magnetic force on the nut is eliminated after the supply rod has stopped just before the destination, so that the end corner of the projection as the center of pivoting of the nut can be positioned precisely, contributing to a highly reliable nut supply.

While the invention has been particularly shown and described in reference to preferred embodiments thereof, it will be understood by those skilled in the art that changes in form and details may be made therein without departing from the spirit and scope of the invention.

What is claimed is:

1. A method for supplying a projection nut, comprising the steps of:
   supporting a projection nut at an end portion of a supply rod with an end projection thereof, said end projection being U-shaped and fixed to an outer rod of said supply rod;
   advancing a supply rod obliquely downward or substantially horizontal with a projection nut attracted at an end portion thereof by a magnetic force while supporting the projection nut from below at the end portion thereof;

stopping the advance movement of the supply rod immediately before a predetermined destination; and eliminating the magnetic force on the projection nut at substantially the same time as the step of stopping the supply rod advance movement to thereby allow the projection nut to pivot about an end corner provided by the U-shaped end projection at the end portion of the supply rod so as to fit through a guide pin of a stationary electrode waiting thereunder.

2. The method as in claim 1, wherein the step of eliminating the magnetic force on the projection nut includes the step of relatively displacing inner and outer rod portions of the supply rod near a place where the nut is destined to be supplied, and the step of the outer rod portion substantially supporting the inner rod portion.

3. The method as in claim 2, wherein the step of advancing the supply rod includes the step of supporting the projection nut with a magnet attached to an end portion of the inner rod portion of the supply rod.

4. The method as in claim 2, wherein the step of stopping the advanced movement of the supply rod includes the step of stopping the advance movement of the inner rod portion, then stopping the advance movement of the outer rod portion.

5. The method as in claim 1, further comprising a step of magnetizing the end portion of the supply rod by an electromagnet.

6. The method as in claim 5, wherein the step of eliminating the magnetic force includes the step of demagnetizing the magnetized end portion of the supply rod.

7. The method as in claim 1, wherein the step of supporting the projection nut at the end portion of the supply rod includes the step of receiving the projection nut into a notch portion formed by a substantially U-shaped projection at the end portion of the supply rod.

* * * * *